United States Patent
Lee et al.

(10) Patent No.: US 11,719,612 B2
(45) Date of Patent: Aug. 8, 2023

(54) ROTOR FOR RHEOLOGICAL MEASUREMENTS OF MATERIAL WITH VARIABLE VOLUME

(71) Applicant: TA Instruments-Waters LLC, New Castle, DE (US)

(72) Inventors: Reginald Lee, West Chester, PA (US); Amit Ahuja, Wilmington, DE (US); Sally Childears, Dover, DE (US)

(73) Assignee: TA Instruments-Waters LLC, New Castle, DE (US)

(*) Notice: Subject to any disclaimer, the term of this patent is extended or adjusted under 35 U.S.C. 154(b) by 242 days.

(21) Appl. No.: 17/066,013

(22) Filed: Oct. 8, 2020

(65) Prior Publication Data

US 2021/0109002 A1 Apr. 15, 2021

Related U.S. Application Data (60) Provisional application No. 62/915,266, filed on Oct. 15, 2019.

(51) Int. Cl.
*G01N 11/14* (2006.01)
*G01N 11/00* (2006.01)

(52) U.S. Cl.
CPC ........ *G01N 11/14* (2013.01); *G01N 2011/008* (2013.01)

(58) Field of Classification Search
CPC ...................................................... G01N 11/14
See application file for complete search history.

(56) References Cited

U.S. PATENT DOCUMENTS

| 4,884,437 A | * | 12/1989 | Constant | ................. | G01N 11/00 73/54.01 |
| 4,905,504 A | * | 3/1990 | Carriere | .................. | G01N 11/10 73/54.23 |

(Continued)

FOREIGN PATENT DOCUMENTS

| EP | 1750114 A2 | 2/2007 |
| FR | 2687223 A1 | 8/1993 |
| FR | 2758185 A1 | 7/1998 |

OTHER PUBLICATIONS

International Search Report and Written Opinion in PCT/US2020/054777 dated Mar. 19, 2021.

(Continued)

*Primary Examiner* — Alexander A Mercado
(74) *Attorney, Agent, or Firm* — Schmeiser, Olsen & Watts LLP; Victor J. Baranowski (57) ABSTRACT

A rheological system includes a sample chamber, a compressed air system configured to provide compressed air to pressurize the sample chamber, and a rotor configured for rheological measurement of a material with variable volume, the rotor including an elongated shaft extending to a measurement portion having a widened geometry relative to the elongated shaft. The rotor is dimensioned such that a compression ratio of at least 5 to 1 is achievable while maintaining material cover of the sample over the entirety of the measurement portion of the rotor, the compression ratio being defined by a decompressed volume of a sample when the sample chamber is not pressurized to a compressed volume of the sample when the sample chamber is pressurized. Methods of taking rheological measurements with such a rotor are also disclosed.

13 Claims, 10 Drawing Sheets

(56) References Cited

U.S. PATENT DOCUMENTS

| | | | | |
|---|---|---|---|---|
| 5,052,219 A | * | 10/1991 | Fery | E21B 49/005 |
| | | | | 73/152.52 |
| 5,874,665 A | | 2/1999 | Larsson | |
| 5,877,410 A | | 3/1999 | Duke | |
| 6,807,849 B1 | * | 10/2004 | Reed | G01N 11/14 |
| | | | | 73/54.28 |
| 6,931,915 B2 | | 8/2005 | Garritano et al. | |
| 8,813,542 B1 | * | 8/2014 | Bi | G01N 11/14 |
| | | | | 73/54.23 |
| 9,157,846 B1 | * | 10/2015 | Bi | G01N 11/14 |
| 2007/0079961 A1 | * | 4/2007 | Morgan | G01N 11/14 |
| | | | | 166/250.1 |
| 2009/0133477 A1 | | 5/2009 | Wang | |
| 2009/0145207 A1 | * | 6/2009 | Bousmina | G01N 11/14 |
| | | | | 73/61.61 |
| 2010/0126252 A1 | * | 5/2010 | Bailey | G01N 11/14 |
| | | | | 73/54.28 |
| 2013/0219983 A1 | | 8/2013 | George | |
| 2014/0208834 A1 | | 7/2014 | Doe | |
| 2015/0160111 A1 | | 6/2015 | Lewis et al. | |
| 2015/0198512 A1 | * | 7/2015 | Montgomery | G01N 33/383 |
| | | | | 73/843 |
| 2015/0260627 A1 | * | 9/2015 | Lesko | G01N 11/14 |
| | | | | 73/54.29 |
| 2016/0047727 A1 | | 2/2016 | Franck et al. | |
| 2016/0266022 A1 | | 9/2016 | Romirer et al. | |
| 2017/0016878 A1 | * | 1/2017 | Khismatullin | G01N 11/16 |
| 2022/0011210 A1 | * | 1/2022 | Krenn | F16C 32/0611 |

OTHER PUBLICATIONS

Invitation to Pay Additional Fees in PCT/US2020/054777 dated Jan. 26, 2021.

International Preliminary Report on Patentability in PCT/US2020/054777 dated Apr. 28, 2022.

\* cited by examiner

ROTOR FOR RHEOLOGICAL MEASUREMENTS OF MATERIAL WITH VARIABLE VOLUME

RELATED APPLICATIONS

This application is a non-provisional patent application claiming priority to U.S. Provisional Patent Application No. 62/915,266, filed Oct. 15, 2019, entitled "Rotor for Rheological Measurements of Material with Variable Volume," which is incorporated herein by reference.

FIELD OF THE INVENTION

The invention relates generally to rheological measurement systems. More particularly, the invention relates to a rotor for rheological measurements of materials with variable volume, and associated systems and methods.

BACKGROUND

Rheometers are instruments used to characterize rheological properties of materials such as oils, dispersions, suspensions, emulsions, adhesives, biological fluids, polymers, gels, pastes, slurries, melts, resins, powders, foams, or mixtures of the foregoing. As used herein, the term "rheometer" shall include rheometers, viscometers, viscosimeters and any other instrument that may be used to measure the viscoelastic properties of fluids or powders. Typical rheometers impose a specific stress field or deformation to a fluid and monitor the resultant deformation or stress. Rheological measurements in rotational rheometers are performed by applying a stress or deformation in a rotational direction. Rotational rheometers may apply a predetermined torque to a material in a rotational direction and measure the resulting displacement of the material under test, or alternatively may measure the torque required to obtain a predetermined displacement.

Many materials undergo volume changes during production, synthesis, transportation, end use or disposal. Volume changes may occur due to changes in the environment (pressure or temperature), changes in composition (material burn-off or reaction of single or multiple materials), or due to mechanical inputs (mechanical mixing). Accurate rheological measurements throughout these changes is critical to the development and manufacturing of new materials, processes and devices. Current rheometers are sensitive to material volume and will not result in accurate measurements with variable material volume. For example, some foams (liquid/gas structure) reduce in volume by approximately 50% when subjected to pressure at 100% higher than atmospheric pressure. A typical rheometer geometry will be "underfilled" with this type of reduction in volume, which would result in an inaccurate measurement.

Thus, rheometers that provide for accurate measurements of materials with variable volume would be well received in the art.

SUMMARY

In one embodiment, a rheological system comprises: a sample chamber; a compressed air system configured to provide compressed air to pressurize the sample chamber; and a rotor configured for rheological measurement of a material with variable volume, the rotor including an elongated shaft extending to a measurement portion having a widened geometry relative to the elongated shaft, wherein the rotor is dimensioned such that a compression ratio of at least 1.5 to 1 is achievable while maintaining material cover of the sample over the entirety of the measurement portion of the rotor, wherein the compression ratio is defined by a decompressed volume of a sample when the sample chamber is not pressurized to a compressed volume of the sample when the sample chamber is pressurized.

Additionally or alternatively, the measurement portion is cylindrical and includes a circumference and the thickness, wherein the circumference is less than a circumference of the sample chamber and at greater than a circumference of the elongated shaft.

Additionally or alternatively, the measurement portion includes a cylinder wall having vertically oriented straight knurls.

Additionally or alternatively, the measurement portion includes a plurality of outwardly protruding vanes disposed vertically about the circumference.

Additionally or alternatively, the circumference greater than twice the circumference of the elongated shaft.

Additionally or alternatively, the thickness of the measurement portion is less than $\frac{1}{5}$ of a length of the elongated shaft.

Additionally or alternatively, a space separates a bottom of the measurement portion and a bottom of the sample chamber, and wherein the space has a height that is less than a difference between a radius of the elongated shaft and a radius of the sample chamber.

Additionally or alternatively, the rotor further includes a first end and a second end, the rotor further including a circumferential plate located at the first end, wherein the measurement portion is located at the second end.

Additionally or alternatively, the rheological system further comprises a parallel visualization chamber connected to the compressed air system, the rheometer configured to maintain the parallel visualization chamber at the same environmental conditions as the sample chamber; and a camera connected to the parallel visualization chamber configured to detect images within the parallel visualization chamber.

Additionally or alternatively, the rheological system further comprises a camera connected to the sample chamber configured to detect images within the sample chamber.

In another embodiment, a rotor for rheological measurement of a material with variable volume comprises: an elongated shaft extending between a first end and a second end, wherein the first end includes an attachment location configured to provide for attachment to a drive of a rheometer; and a measurement portion located at the second end of the elongated shaft and having a widened geometry relative to the elongated shaft, the measurement portion having a thickness, wherein a ratio of a length of the elongated shaft that is configured to be within a sample chamber when in use to the thickness of the measurement portion is at least 2 to 1.

Additionally or alternatively, the measurement portion is cylindrical and includes a circumference and the thickness, wherein the circumference is greater than a circumference of the elongated shaft.

Additionally or alternatively, the cylindrical widened geometry includes a cylinder wall having vertically oriented straight knurls.

Additionally or alternatively, the cylindrical widened geometry includes a plurality of outwardly protruding vanes disposed vertically about the circumference.

Additionally or alternatively, the circumference is greater than twice the circumference of the elongated shaft.

Additionally or alternatively, the thickness of the cylindrical widened geometry is less than ⅕ of the length of the elongated shaft that is configured to be within a sample chamber when in use.

Additionally or alternatively, the rotor further a circumferential plate located at the first end, wherein the measurement portion is located at the second end.

In another embodiment, a method of taking a rheological measurement of a material with variable volume comprises: filling a sample chamber of a rheometer at least partially with a sample, wherein a rotor extends into the sample chamber, the rotor including an elongated shaft extending to a measurement portion having a widened geometry relative to the elongated shaft; pressurizing the sample chamber such that a compression ratio of the material of at least 1.5 to 1 is achieved, wherein the compression ratio is defined by a decompressed volume of a sample when the sample chamber is not pressurized to a compressed volume of the sample when the sample chamber is pressurized; and maintaining material cover of the sample over the entirety of the measurement portion of the rotor during the pressurizing.

Additionally or alternatively, the method further includes detecting images with a camera within the sample chamber during the pressurizing.

Additionally or alternatively, the method further includes maintaining a parallel visualization chamber at the same environmental conditions as the sample chamber; and detecting images with a camera within the parallel visualization chamber during the pressurizing.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As described herein, a rheological measurement system is described that includes a novel approach for taking rheological measurements of materials with variable volume. Specifically, the approach recognizes that certain materials with variable volume, such as foams, whipped creams, mousses or other bubbly compositions, cause problems for existing rheometers when subjected to high pressures within pressure chambers during rheological testing. It has been found by the inventors that when a material is compressed within a pressurized sample chamber so that the material does not sufficiently cover the rotor or bob, the accuracy of measurement results suffers. The present invention seeks to maintain accurate rheological measurements in the case of materials having variable volume, across the various tested volumes of the material. To achieve this, novel methods and structure are contemplated for a rheological rotor.

Specifically, a rotor is contemplated that is dimensioned such that a compression ratio of at least 1.5 to 1 is achievable while maintaining material cover of the sample over the entirety of a widened measurement geometry of the rotor. Hereinafter a "compression ratio" is defined by a decompressed volume of a sample (e.g. when the sample chamber is not pressurized or when a sample is otherwise expanded in volume such as by a chemical reaction or drying) to a compressed volume of the sample (e.g. when the sample chamber is pressurized). Compression and decompression of a sample may be due to pressure, drying, a chemical reaction, sub-ambient pressurization, or any other means of compressing or decompressing a sample. Thus, the rotor described herein is configured to maintain accurate measurements when the volume of a material is reduced by 1.5 or more times. While compression ratios of at least 1.5 to 1 are contemplated, the embodiments shown in the Figures each achieve compression ratios of at least 5 to 1.

Figure 1:
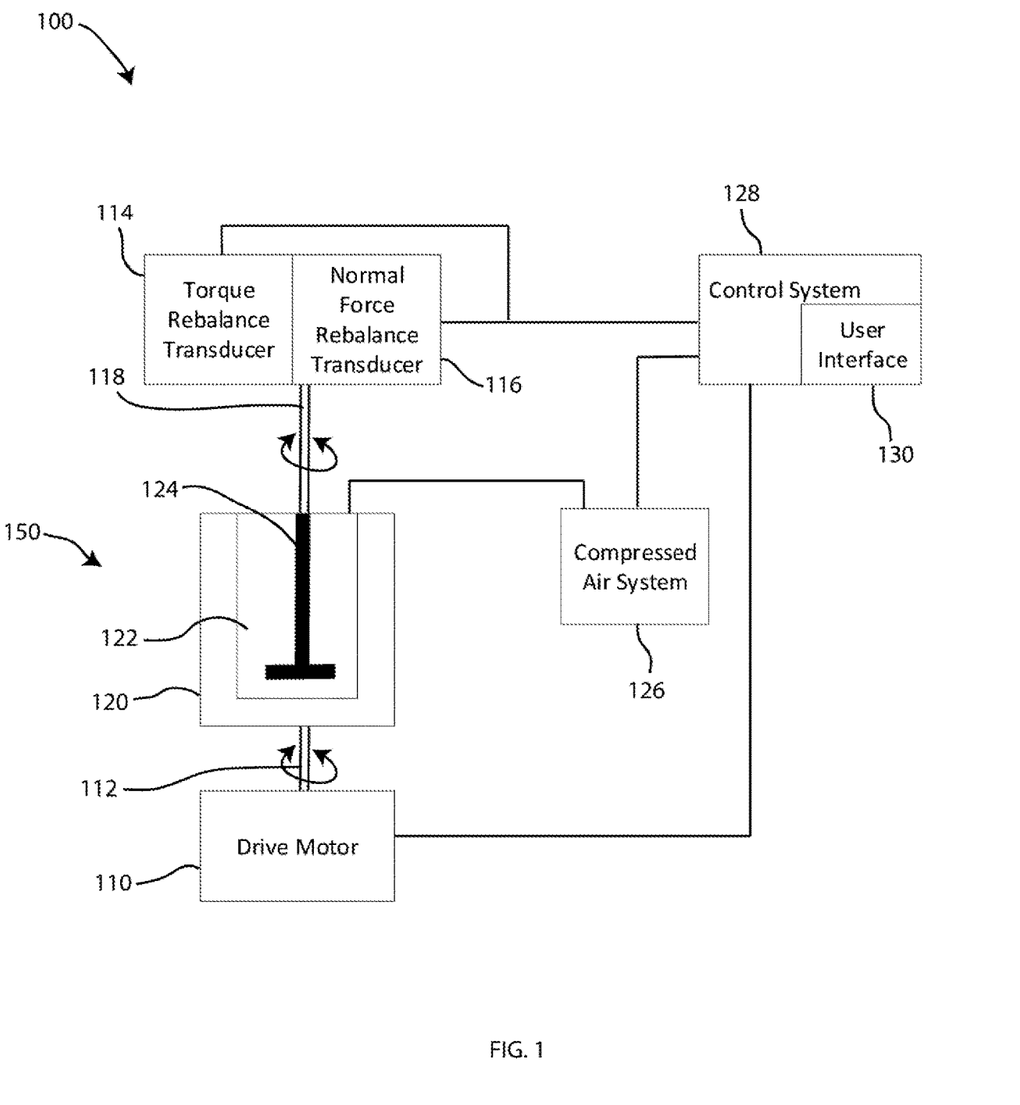
FIG. 1 depicts a schematic view of a rheometer in accordance with one embodiment.

Embodiments of the present invention can be deployed with any pressurized rheological measurement system and/or methods of taking rheological measurements. An exemplary rheological system is shown in FIG. 1. Specifically, FIG. 1 depicts a schematic view of a rheometer 100 in accordance with one embodiment. While the rheometer 100 includes various features described herein, it should be understood that the principles of the present invention may be applied to any other pressurized rheological measurement system configured to measure rheological properties having less or more than the schematic components shown in FIG. 1.

The rheometer 100 includes a drive motor 110 driving an output 112, a torque rebalance transducer 114 and a normal force rebalance transducer 116 having an output 118. A surrounding body 120 of a sample chamber 122 is shown attached to the output 112 of the drive motor 110, while a rotor 124 located within the sample chamber 122 is shown attached to the output 118 of the torque rebalance transducer 114 and a normal force rebalance transducer 116. A compressed air system 126 is in operable communication with the sample chamber 122 for pressurizing the sample chamber 122 with compressed air. A control system 128 having a user interface 130 is shown operably connected to each of the drive motor 110, the torque rebalance transducer 114, the normal force rebalance transducer 116 and the compressed air system 126. While the embodiment shown includes a single control system 128 for controlling the drive motor 110, the torque rebalance transducer 114, the normal force rebalance transducer 116 and the compressed air system 126, other embodiments may include separate control systems. For example, the compressed air system 126 may include a separate manual or automatic control system that controls only the compressed air system 126 in a manner that is independent from the drive motor 110, the torque rebalance transducer 114 and the normal force rebalance transducer 116.

The drive motor 110 may be configured to deliver accurate rotational motion of the output 112 over a broad range of angular displacement and velocity. The drive motor 110 may, for example, include an air bearing system, a high-torque friction-free brushless DC motor, an optical encoder and a temperature sensing system. The drive motor 110, and the features thereof, may be controlled by the control system 128 and directed by inputs from the user interface 130.

The torque rebalance transducer 114 may be configured to measure accurate sample stress based on the torque required on the output 118 to maintain a null position. The torque rebalance transducer 114 may include a dynamic torque range of, for example, 5,000,000 to 1. The torque rebalance transducer 114 may include an air bearing, a high resolution capacitive angle sensor, and a temperature sensing system. Like the drive motor 110, the torque rebalance transducer 114, and the features thereof, may be controlled by the control system 128 and directed by inputs from the user interface 130.

The normal force rebalance transducer 116 may be configured to measure accurate normal forces on the output 118 from a sample within the sample chamber 122. The normal force rebalance transducer 116 may utilize position feedback to maintain the shaft of the output 118 in a null position. The normal force rebalance transducer 116, and the features thereof, may be controlled by the control system 128 and directed by inputs from the user interface 130. Additionally, the normal force rebalance transducer 116 may be equipped with a pressure sensing system for measuring pressure in the sample chamber 122.

The surrounding body 120, the sample chamber 122, the rotor 124 and the compressed air system 126 may be integral components of the rheometer 100. Alternatively, it is contemplated that these components 120, 122, 124, 126 are separately attachable add-on features of a pressure cell 150 that is attachable to, and detachable from, to the outputs 112, 118. Whatever the embodiment, the surrounding body 120 defining the sample chamber 122 is attachable to the drive motor 110 and the output 112 thereof in order to rotate with the rotation of the output 112. Likewise, the rotor 124 is attachable to the output 118 of the torque rebalance transducer 114 and the normal force transducer 116 and may be configured to move with movement of the output 112. The rotor 124 may be configured to rotate relative to the surrounding body 120 defining the sample chamber 122. The air compression system 126 may be configured to provide compressed air to the sample chamber 122 through a cap attached to the rotor 124. The air compression system 126 is configured to maintain pressurization of the sample chamber 122 during rotation of the surrounding body 120 about the rotor 124.

The control system 128 may be configured to control and monitor the stresses, strains, forces, velocities, and the like, on the components of the system. The control system 128 may be configured to provide output information related to measurements conducted during testing of materials or samples within the sample chamber 122. The control system 128 may be configured to control motion of the outputs 112, 118, and further control the pressure within the sample chamber 122 through control of the compressed air system 126. The user interface 130 may be a screen or other input interface configured to allow a technician to interact with the rheometer 100, change settings, define test conditions, and the like.

The embodiment shown in FIG. 1 shows a separate motor and transducer system having a dual head design. However, the principles of the present invention are not limited to this design. Rather, the pressure cell 150 and the sample chamber 122 described herein may be applied to other rheometer designs, such as a rheometer having a combined motor and transducer with a single head where a sample is placed on a static sample chamber 122. In such an embodiment, the bottom output 118 would remain static.

Figure 2:
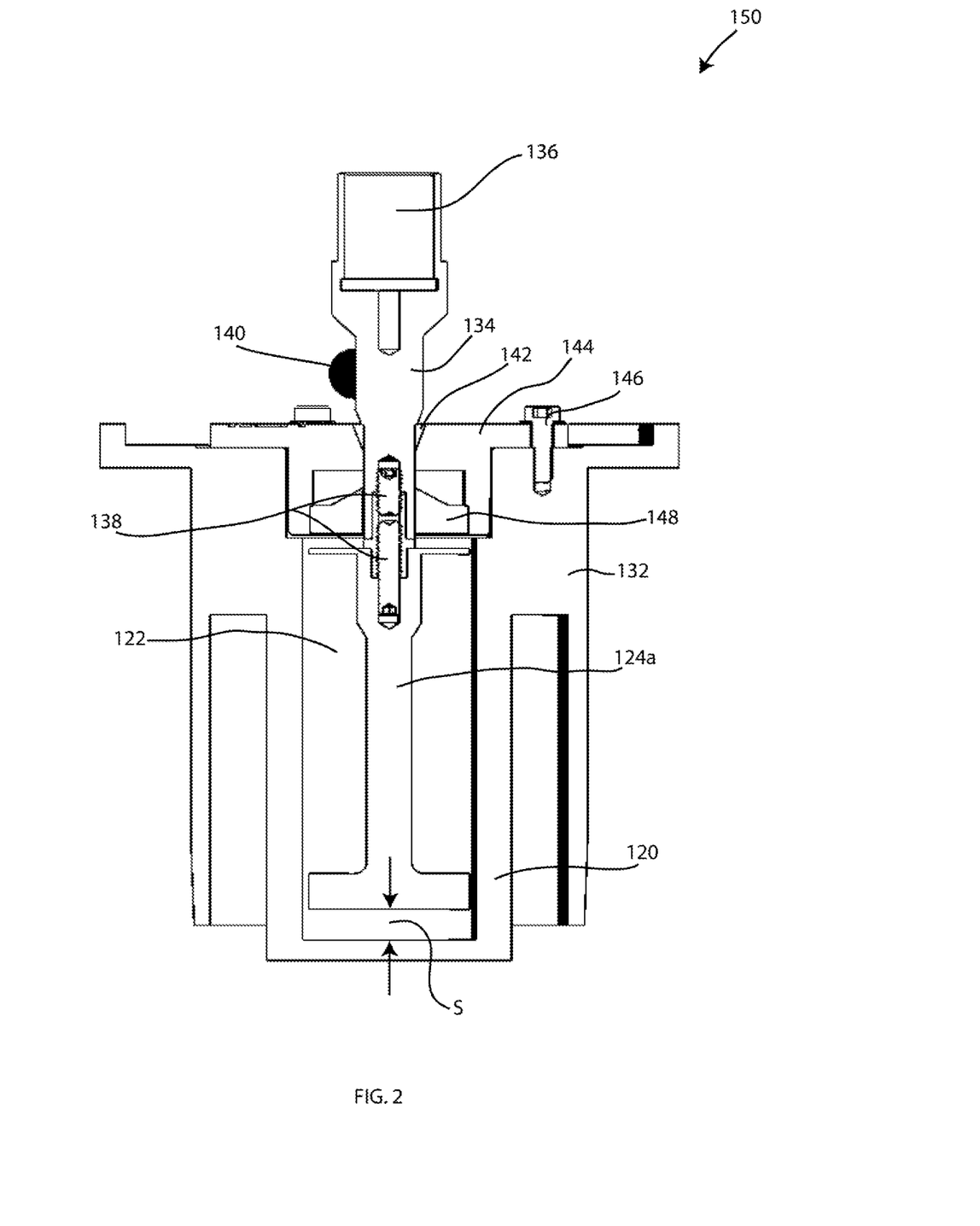
FIG. 2 depicts a side cross sectional view of a pressure cell of the rheometer of FIG. 1 having a rotor in accordance with one embodiment.

FIG. 2 depicts a side cross sectional view of the pressure cell 150 of FIG. 1 having a rotor 124a attached thereto in accordance with one embodiment. The pressure cell 150 includes the surrounding body 120 defining the sample chamber 122. The surrounding body 120 includes a heat transfer jacket 132, an output shaft 134 having a connection interface 136 configured to be connected to the output 118. A threaded connection interface 138 connects the output shaft 134 with the rotor 124a. The threaded interface 138 may further include a heat break that may include a reinforced polymer layer that separates the two halves of the threaded interface 138. A compressed air inlet 140 is configured to receive compressed air from the air compression system 126. A cap 144 is attached to the surrounding body 120 and heat transfer jacket 132 with an attachment bolt 146. An air gap 142 exists between the cap 144 and the output shaft 134 through which a flow of air is configured to escape from the sample chamber 122 during pressurization. In the embodiment shown, the output shaft 134 and attached rotor 124a are configured to rotate about the surrounding body 120 and the heat transfer jacket 132 and the cap 144.

The pressure cell 150 of FIG. 1 may be a high sensitivity pressure cell that provides for complete viscoelastic characterization of a material or fluid in a pressurized environment under high pressures. The pressure cell 150 may employ an air bearing seal that allows low torque performance with increased torque sensitivity, thereby allowing the characterization of critical material behavior such as time, frequency, and strain-dependence on the widest range of fluids, including at temperatures above the boiling point of volatile components. This range of test conditions can provide insight to material properties representative of extreme processing or use conditions, such as downhole or extrusion environments. Such as system can provide stable and accurate temperature control from −5° C. to 150° C. with a concentric cylindrical heat transfer jacket 132. Atmospheric pressure control up to 5 bar may be accomplished to simulate processing and use conditions for materials under test. While the various rotors described herein may be used in such a pressure cell 150, the rotos may also be used in any form of a rheometric environment, including standard rheometric cells, cavities or the like. Further, while enclosed and pressurized cells are contemplated as a primary use-case for the rotors described herein, applications may also be found in open test chambers that are subject only to atmospheric pressure conditions without pressurization of the sample.

Figure 3:
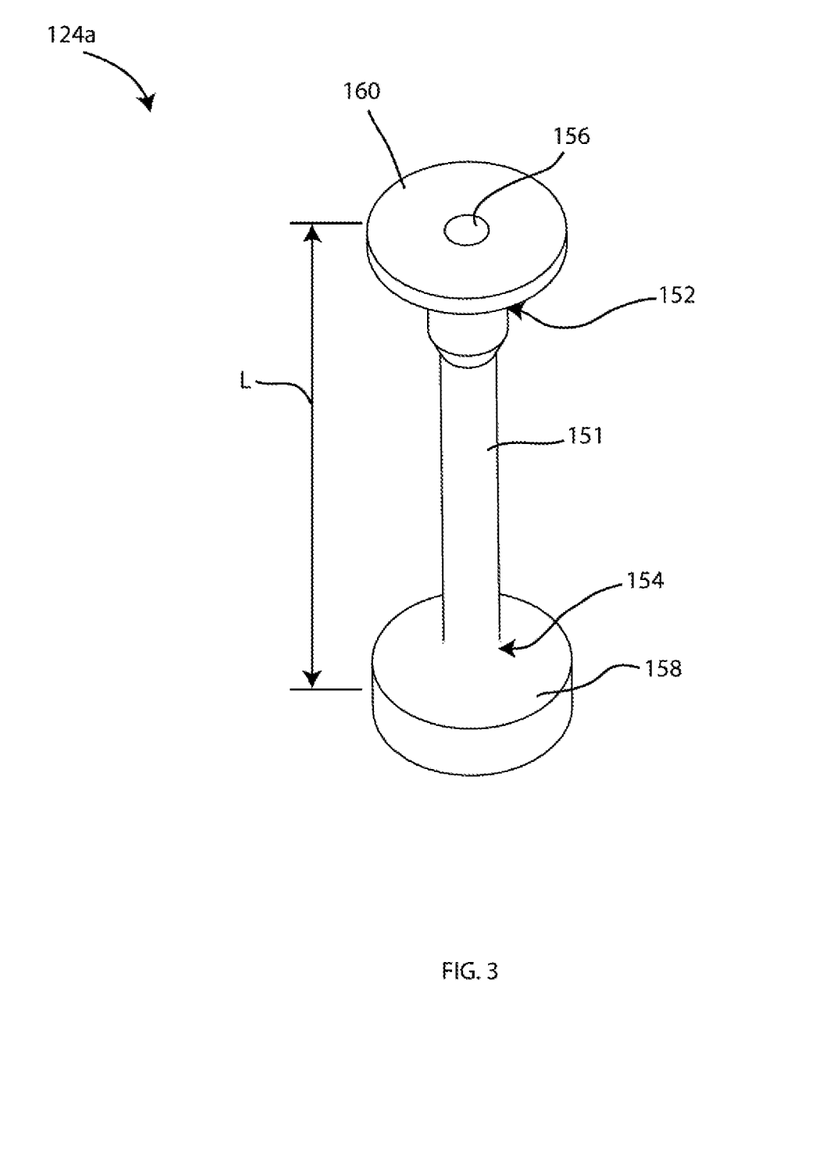
FIG. 3 depicts a perspective view of the rotor of FIG. 2 before installation into the pressure cell of FIG. 2, in accordance with one embodiment.

FIG. 3 depicts a perspective view of the rotor 124a of FIG. 2 before installation into the pressure cell 150 of FIG. 2, in accordance with one embodiment. The rotor 124a includes an elongated shaft 151 extending a length L1 from a first end 152 to a second end 154. The first end 152 includes an attachment location 156 configured to provide for attachment of the rotor 124a to the drive motor 110 of the rheometer 100 through the output 118. The attachment location 156 is shown as a bore which may include internal threads therein configured to receive the external threads of the threaded connection interface 138. A circumferential plate 160 is also located at the first end 152. The circumferential plate 160 is dimensioned to maintain a volume-expanded sample substantially below the circumferential plate 160 during testing and prior to removal from the sample chamber 122 and prevent sample material from climbing up the elongated shaft 151 past the circumferential plate 160 and into the air gap 142, the compressed air inlet 140, and the cap 144.

The bore of the attachment location 156 is shown extending into the circumferential plate 160 and within a thicker top region 161 of the elongated shaft 151. The thicker top region 161 is configured to house the internal threaded connection interface 138, as shown in FIG. 2. The thicker top region 161 is further configured to provide structural support at the connection point to maintain structural alignment between the rotor 124a and the output shaft 134.

The rotor 124a further includes measurement portion 158 located at the second end 154 of the elongated shaft 151. The measurement portion 158 includes a widened geometry relative to the elongated shaft 151. As shown, the measurement portion 158 is cylindrical and includes a circumference and a thickness T. The relative dimensions between the elongated shaft 151 and the measurement portion 158 are important in order to provide a measurement rotor that maintains accuracy during various compression and expansion volumes of a sample under test. In one embodiment, a ratio of the length L of the elongated shaft 150 to the thickness T of the measurement portion 158 is at least 2 to 1. In the embodiment shown, the ratio of the length L of the elongated shaft 150 to the thickness T of the measurement portion 158 is approximately 4 to 1. In another embodiment, the ratio may be at least 2 to 1, at least 3 to 1, at least 5 to 1 or at least 6 to 1. The greater the ratio of the length L of the elongated shaft 150 to the thickness T of the measurement portion 158, the less underfilling inaccuracies will occur when a variable volume sample is compressed significantly.

The circumference of the measurement portion 158 is less than a circumference of the sample chamber 122 and greater than a circumference of the elongated shaft 150. A small space may be located between the outer circumferential wall of the measurement portion 158 and the wall of the sample chamber 122. The space may be, for example, 1 mm or any other distance that allows movement between the sample chamber 122 and the measurement portion 158. In the embodiment shown, the circumference of the measurement portion 158 is greater than twice the circumference of the elongated shaft 151. The circumference of the measurement portion 158 may be greater than three times the circumference of the elongated shaft 151.

The gap and height of the measurement portion 158 to that of the surrounding body 120 may be configured to generate sufficient measurement sensitivity that the measurement artifact caused by the gap and length between the elongated shaft 151 to the surrounding body 120 is less than 5%. Texturing of the outer wall or surface of the measurement portion 158 is contemplated such that the potential artifact from sample wall slippage is minimized.

The thickness T of the measurement portion 158 may be sufficient to create a shearing surface with sample material within the sample chamber 122, but otherwise may be narrow enough to enable a variable volume sample material that has been significantly compressed to maintain material cover of the sample over the entirety of the measurement portion 158 of the rotor 124a. In the embodiment shown, the thickness T is less than ⅕ of a length of the elongated shaft 151. Thus, a substantial portion of a total height of the sample chamber 158 is occupied by the elongated shaft 151 while a smaller portion of the sample chamber 158 is occupied by the thickness T of the measurement portion 158.

As shown in FIG. 2, the total length dimension of the rotor 124a may be such that a space S separates a bottom of the measurement portion 158 and a bottom of the sample chamber 122. The space S may be, for example, 5 mm or 6 mm. The space S may be significantly larger than the space between the cylindrical wall of the measurement portion 158 and the sidewall of the sample chamber 122. For example, the space S may have a height that is less than a difference between a radius of the elongated shaft and a radius of the sample chamber.

Figure 4:
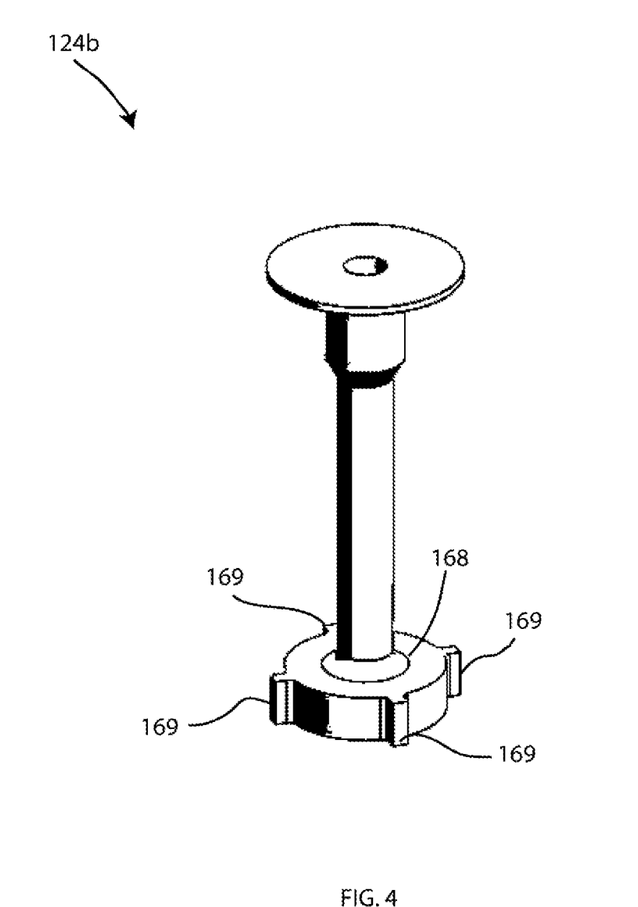
FIG. 4 depicts a perspective view of another rotor before installation into the pressure cell of FIG. 2, in accordance with one embodiment.

FIG. 4 depicts a perspective view of another rotor 124b before installation into the pressure cell 150 of FIG. 2, in accordance with one embodiment. The rotor 124b may include substantially the same structure as the rotor 124a, with the exception of a different measurement portion 168. Unlike the measurement portion 158 of the rotor 124a, the measurement portion 168 of the rotor 124b includes a plurality of outwardly protruding vanes 169 disposed vertically about the circumference of the measurement portion 168. In particular, the outwardly protruding vanes 169 are shown as short vanes that, when added to the circumference of the rest of the measurement portion 168, extend a distance equal, or substantially equal, to the circumference of the measurement portion 158 of the rotor 124a. The embodiment shown includes four vanes 169, each disposed 90 degrees apart about the circumference of the measurement portion 168.

Figure 5:
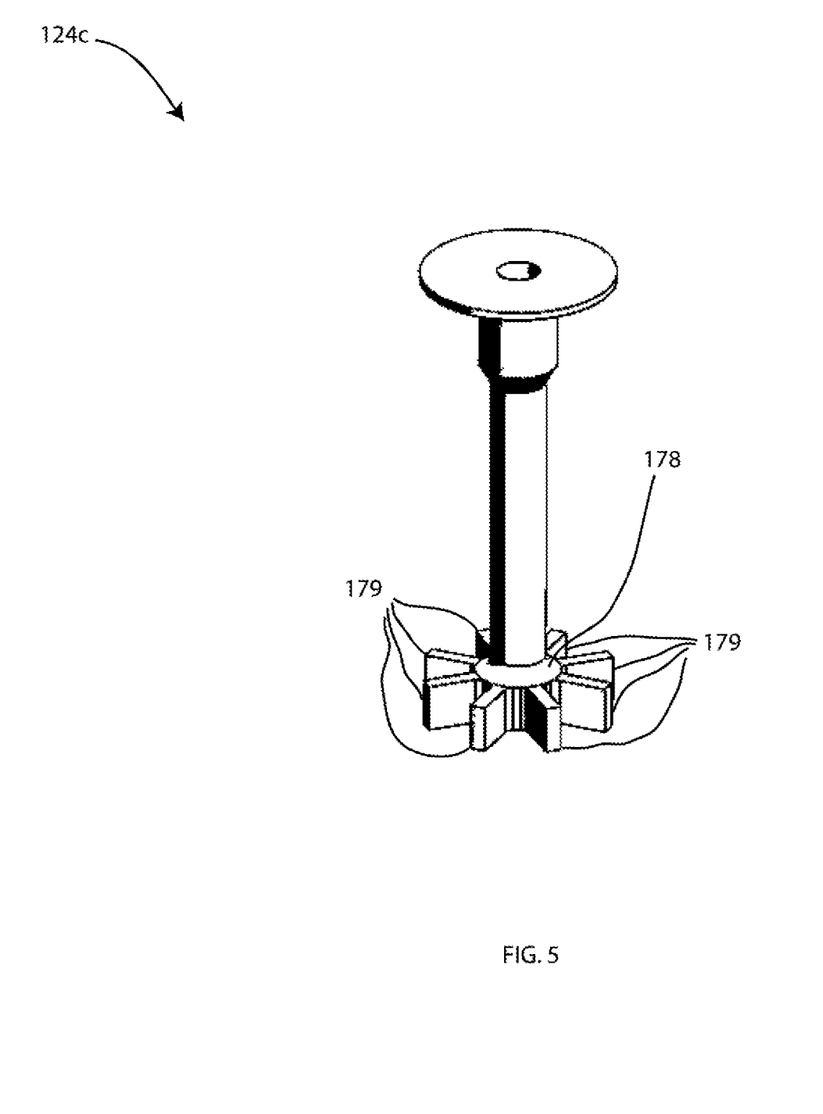
FIG. 5 depicts a perspective view of another rotor before installation into the pressure cell of FIG. 2, in accordance with one embodiment.

FIG. 5 depicts a perspective view of another rotor 124c before installation into the pressure cell 150 of FIG. 2, in accordance with one embodiment. The rotor 124c may include substantially the same structure as the rotor 124a, with the exception of a different measurement portion 178. Unlike the measurement portion 158 of the rotor 124a, the measurement portion 178 of the rotor 124c includes a plurality of outwardly protruding vanes 179 disposed vertically about the circumference of the measurement portion 178. In particular, the outwardly protruding vanes 179 are shown as elongated vanes that comprise a substantial portion of the circumference of the measurement portion 178 and extend a distance equal, or substantially equal, to the circumference of the measurement portion 158 of the rotor 124a. The embodiment shown includes eight elongated vanes 179, each disposed 45 degrees apart about the circumference of the measurement portion 178.

Figure 6:
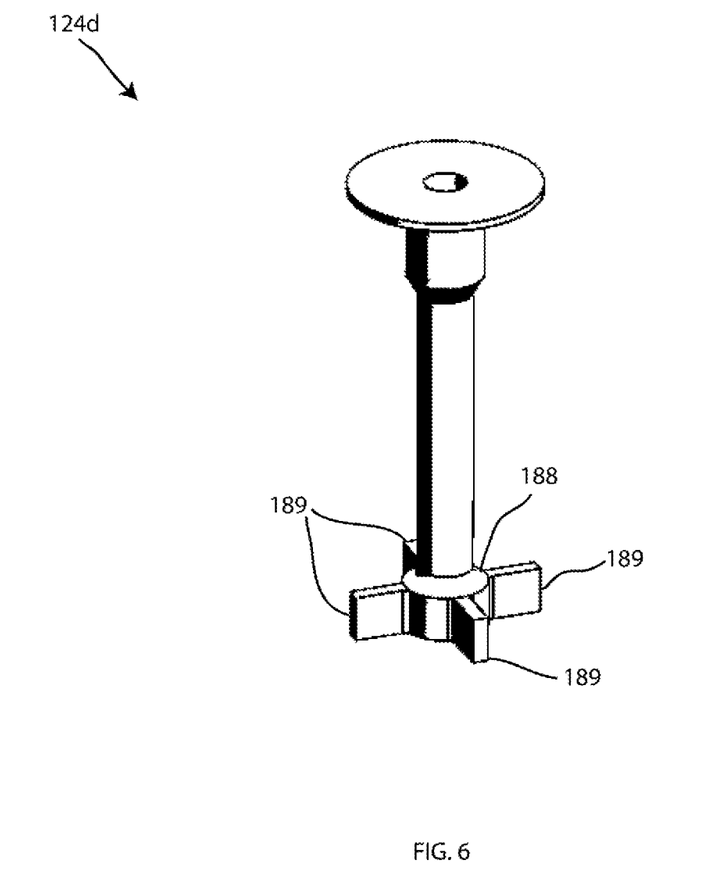
FIG. 6 depicts a perspective view of another rotor before installation into the pressure cell of FIGS. 2, in accordance with one embodiment.

FIG. 6 depicts a perspective view of another rotor 124d before installation into the pressure cell 150 of FIGS. 2, in accordance with one embodiment. The rotor 124d may include substantially the same structure as the rotor 124a, with the exception of a different measurement portion 188. Unlike the measurement portion 158 of the rotor 124a, the measurement portion 188 of the rotor 124d includes a plurality of outwardly protruding vanes 189 disposed vertically about the circumference of the measurement portion 188. In particular, the outwardly protruding vanes 189 are shown as elongated vanes that comprise a substantial portion of the circumference of the measurement portion 188 and extend a distance equal, or substantially equal, to the circumference of the measurement portion 158 of the rotor 124a. The embodiment shown includes four elongated vanes 189, each disposed 90 degrees apart about the circumference of the measurement portion 188.

Figure 7:
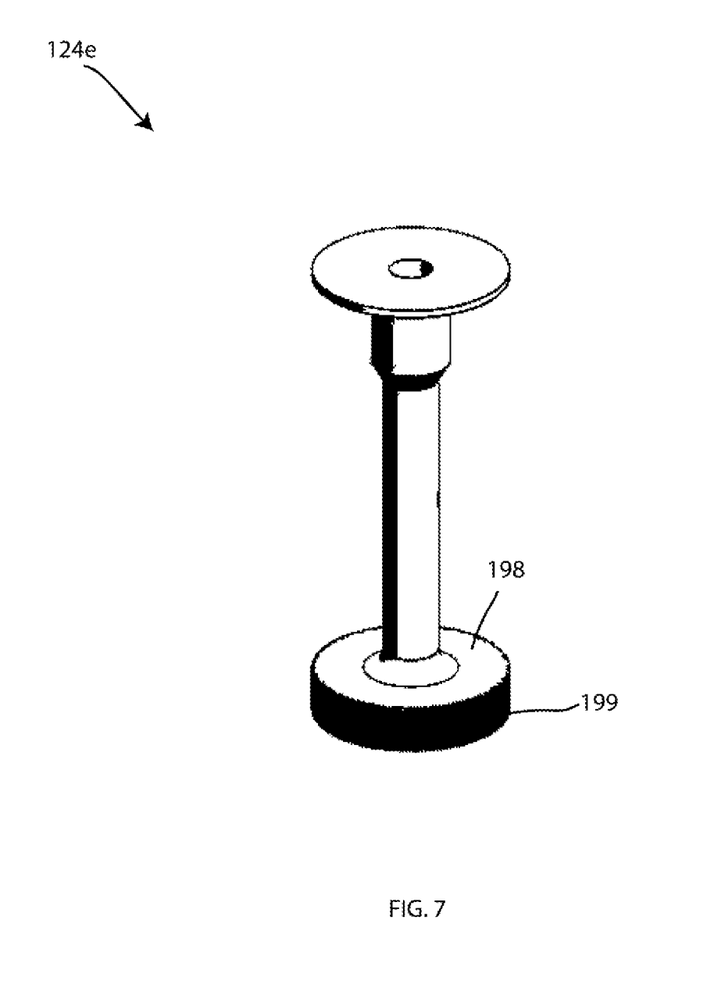
FIG. 7 depicts a perspective view of another rotor before installation into the pressure cell of FIGS. 2, in accordance with one embodiment.

FIG. 7 depicts a perspective view of another rotor 124e before installation into the pressure cell 150 of FIGS. 2, in accordance with one embodiment. The rotor 124e may include substantially the same structure as the rotor 124a, with the exception of a different measurement portion 198. Unlike the measurement portion 158 of the rotor 124a, the measurement portion 178 of the rotor 124e includes cylinder wall having vertically oriented straight knurls 199 disposed about the entirety of the cylinder wall.

The above embodiments of the rotors 124a, 124b, 124c, 124d, 124e are meant to be exemplary, each maintaining measurement accuracy when performing rheological testing on samples having variable volumes when pressurized. The various rotors 124a, 124b, 124c, 124d, 124e may be placed within the pressure cell 150 as described hereinabove and shown in FIG. 2. Other rotor embodiments besides the rotors 124a, 124b, 124c, 124d, 124e are contemplated. For example, rotors having more or less vanes, longer or shorter vanes, or other types of knurls (e.g. diamond knurls) are contemplated. For example, the rotor may include a cylindrical wall having an engineered surface roughness by blasting, 3D printed layering, or other intentionally applied abrasions.

Figure 8:
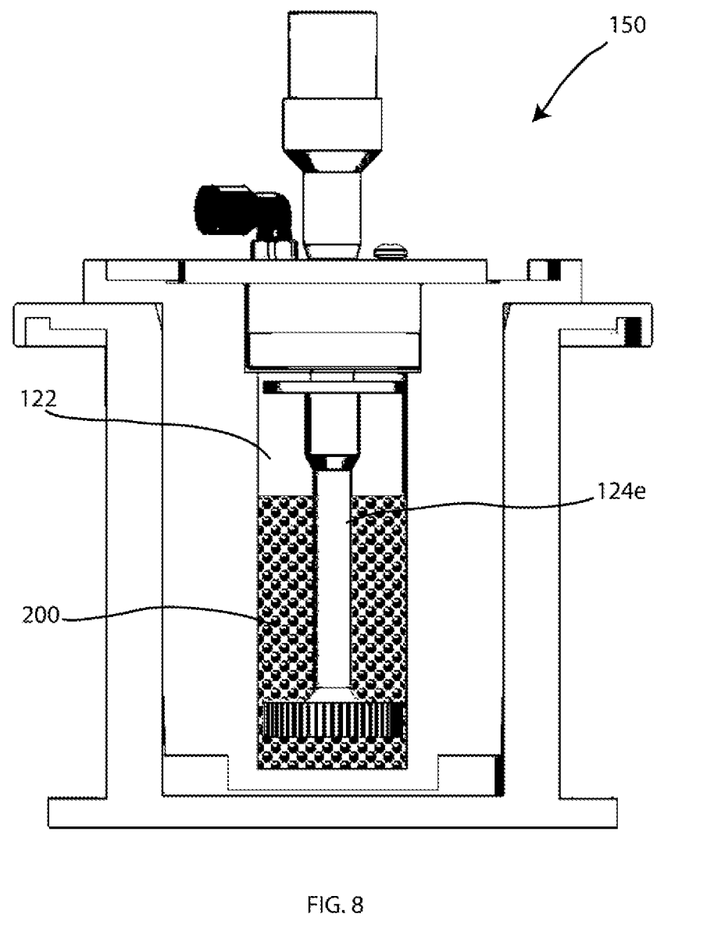
FIG. 8 depicts a side cross sectional view of the pressure cell of FIG. 2 having the rotor of FIG. 7 and filled with a sample prior to compression in accordance with one embodiment.
Figure 9:
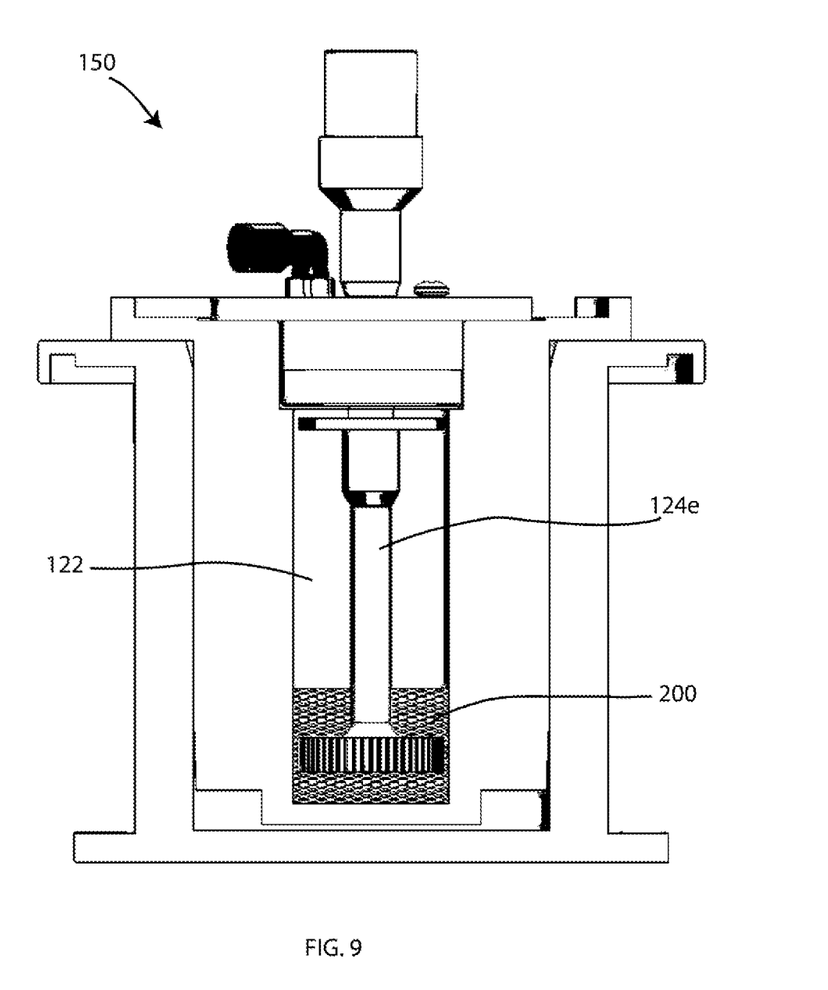
FIG. 9 depicts a side cross sectional view of the pressure cell of FIG. 2 having the rotor of FIG. 7 and filled with a sample after compression in accordance with one embodiment.

FIG. 8 depicts a side cross sectional view of the pressure cell 150 of FIG. 2 having the rotor 124e of FIG. 7 and filled with a sample 200 prior to compression in accordance with one embodiment. Similarly, FIG. 9 depicts a side cross sectional view of the pressure cell 150 of FIG. 2 having the rotor 124e of FIG. 7 and filled with the sample 200 after compression in accordance with one embodiment. As shown, the maximum sample volume in the sample chamber 122 while maintaining accurate results may be defined as the volume between the bottom of the sample chamber 122 and the bottom of the circumferential plate 160. The minimum sample volume in the sample chamber 122 while maintaining accurate results may be defined as the volume between the bottom of the sample chamber 122 and a volume that maintains material cover of the sample 200 over the entirety of the measurement portion of the rotor 124e (i.e. just above the measurement portion of the rotor). As shown, prior to compression and after compression, the sample 200 shown in FIGS. 8 and 9 are maintained within the maximum and minimum volumes. Thus, rheological testing can be accomplished in both the decompressed state and compressed state of the sample, and any pressurized state in between, without measurement accuracy suffering. For example, the measurement accuracy may have less than 5% error.

The "compression ratio", defined as a ratio between the maximum volume and minimum volumes of a material within the sample chamber 122, may be, for example, at least 1.5 to 1 while maintaining material cover of the sample 200 over the entirety of the measurement portion of the rotor. Compression ratios of at least 2 to 1, 3 to 1, 4 to 1, 5 to 1, and 10 to 1 are contemplated, depending on the size and dimensions of the rotor and measurement portion thereof. The greater the volume of the measurement portion (e.g. in the larger measurement portions shown in FIGS. 3 and 7), the higher the maximum compression ratio allowable in the system without changing the dimensions of the sample chamber 122. Methods contemplated herein comprise creating a rheological rotor dimensioned to maintain material cover over the measurement portion of the rotor when a material has a specified compression ratio.

Figure 10:
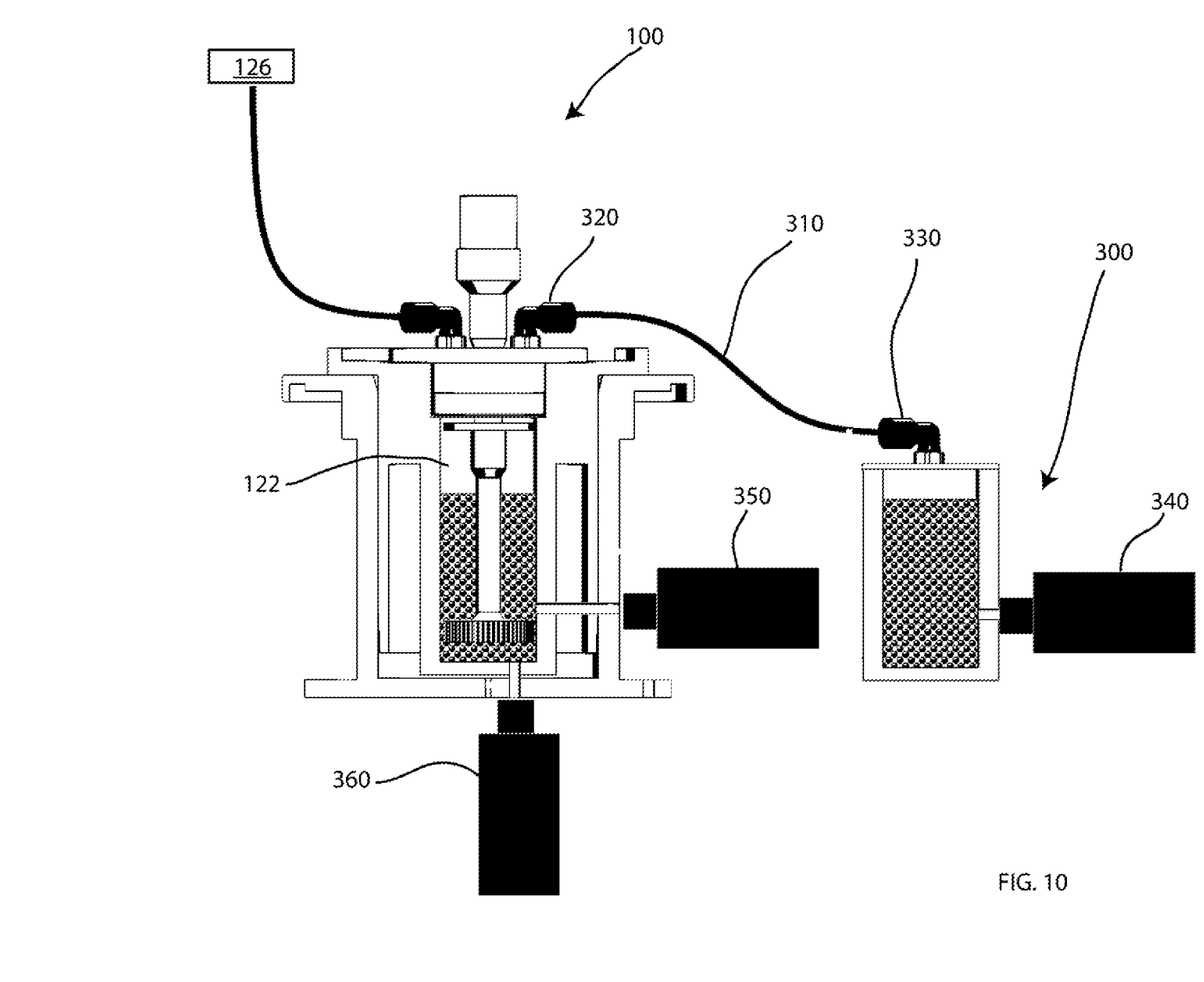
FIG. 10 depicts a side cross sectional view of the pressure cell of FIG. 2 also including three optional vision systems in accordance with one embodiment.

FIG. 10 depicts a side cross sectional view of the pressure cell of FIG. 2 also including three optional vision systems in accordance with one embodiment. While the embodiment shows all three vision systems, any combination of one or more of the shown vision systems are contemplated. Specifically, the rheometer 100 is shown in FIG. 10 to include a parallel visualization chamber 300 connected to the compressed air system 126. The parallel visualization chamber 300 is a parallel chamber having the same pressure properties as the sample chamber 122. This may be accomplished by connecting an air pressure line 310 between the sample chamber 122 and the parallel visualization chamber 300. Thus, the rheometer 100 may be configured to maintain the parallel visualization chamber 300 at the same environmental conditions as the sample chamber 122. The air pressure line 310 may be connected to the sample chamber 122 at a first port 320, and may be connected to the parallel visualization chamber 300 at a second port 330. A camera 340 is shown connected to the parallel visualization chamber 300. The camera 340 may be configured to detect or otherwise capture images within the parallel visualization chamber 300. For example, the camera 340 may provide images to the user interface 130 or the control system 128 of the rheometer 100, or may provide the images captured to an outside device (not shown).

Two additional cameras 350, 360 are also shown. The cameras 350, 360 are each shown connected to the sample chamber 122 and may each be configured to detect images within the sample chamber 122. The camera 350 may extend through a side wall of the sample chamber 122 at a location that is just above the measurement portion of the rotor. Other side wall locations are contemplated, such as at the measurement portion or below the measurement portion. The camera 360 may extend through the bottom of the sample chamber 122, pointing up at the space between the bottom of the sample chamber 122 and the measurement portion of the rotor. One or more of the cameras 340, 350, 360 may be implemented to provide real time visual observation of the samples under pressure.

Further disclosed herein are methods of performing rheological measurements on materials having variable volume. Methods include filling a sample chamber of a rheometer at least partially with a sample, where the rheometer includes a rotor that extends into the sample chamber, the rotor including an elongated shaft extending to a measurement portion having a widened geometry relative to the elongated shaft. The method includes pressurizing the sample chamber such that a compression ratio of the material of at least, 1.5 to 1, 2 to 1, 4 to 1, 5 to 1, or even 10 to 1 is achieved. The compression ratio may be defined by a decompressed volume of a sample when the sample chamber is not pressurized to a compressed volume of the sample when the sample chamber is pressurized. The method may include maintaining material cover of the sample over the entirety of the measurement portion of the rotor during the pressurizing. The method further includes detecting images with a camera within the sample chamber during the pressurizing. Alternatively, the method includes maintaining a parallel visualization chamber at the same environmental conditions as the sample chamber, and detecting images with a camera within the parallel visualization chamber during the pressurizing.

While the invention has been shown and described with reference to specific embodiments, it should be understood by those skilled in the art that various changes in form and detail may be made therein without departing from the spirit and scope of the invention as recited in the accompanying claims.

What is claimed is:

1. A rheological system comprising:
   a sample chamber;
   a compressed air system configured to provide compressed air to pressurize the sample chamber;
   a rotor configured for rheological measurement of a material with variable volume, the rotor including an elongated shaft extending to a measurement portion having a widened geometry relative to the elongated shaft;
   a parallel visualization chamber connected to the compressed air system, the system configured to maintain the parallel visualization chamber at the same pressure as the sample chamber; and
   a camera configured to detect images within the parallel visualization chamber.

2. The rheological system of claim 1, wherein the measurement portion is cylindrical and includes a circumference and a thickness, wherein the circumference is less than a circumference of the sample chamber and greater than a circumference of the elongated shaft.

3. The rheological system of claim 2, wherein the measurement portion includes a cylinder wall having vertically oriented straight knurls.

4. The rheological system of claim 2, wherein the measurement portion includes a plurality of outwardly protruding vanes disposed vertically about the circumference of the cylindrical measurement portion.

5. The rheological system of claim 2, wherein the circumference of the cylindrical measurement portion is greater than twice the circumference of the elongated shaft.

6. The rheological system of claim 5, wherein the thickness of the measurement portion is less than $\frac{1}{5}$ of a length of the elongated shaft.

7. The rheological system of claim 6, wherein a space separates a bottom of the measurement portion and a bottom of the sample chamber, and wherein the space has a height that is less than a difference between a radius of the elongated shaft and a radius of the sample chamber.

8. The rheological system of claim 1, wherein the rotor further includes a first end and a second end, the rotor further including a circumferential plate located at the first end, wherein the measurement portion is located at the second end.

9. The rheological system of claim 1, further comprising an air pressure line connecting the sample chamber and the parallel visualization chamber.

10. The rheological system of claim 1, wherein the system is further configured to maintain the parallel visualization chamber at the same temperature as the sample chamber.

11. A method of taking a rheological measurement of a sample of a material with variable volume comprises:
    filling a sample chamber of a rheometer at least partially with the sample, wherein a rotor extends into the sample chamber, the rotor including an elongated shaft extending to a measurement portion having a widened geometry relative to the elongated shaft;
    pressurizing the sample chamber;
    maintaining material cover of the sample over the entirety of the measurement portion of the rotor during the pressurizing,
    maintaining a parallel visualization chamber at the same pressure as the sample chamber; and
    detecting images within the parallel visualization chamber during the pressurizing with a camera.

12. The method of claim 11, further comprising connecting the sample chamber and the parallel visualization chamber with an air pressure line.

13. The method of claim 11, further comprising maintaining the parallel visualization chamber at the same temperature as the sample chamber.

* * * * *